United States Patent [19]
Wheatley

[11] Patent Number: 4,749,481
[45] Date of Patent: Jun. 7, 1988

[54] DISPOSABLE WATER PURIFIER

[76] Inventor: Robert T. Wheatley, 821 Don Quixote, El Paso, Tex. 79922

[21] Appl. No.: 891,942

[22] Filed: Aug. 1, 1986

[51] Int. Cl.$^4$ ............................................. B01D 27/02
[52] U.S. Cl. .................................... 210/282; 210/283; 210/484
[58] Field of Search ................... 210/198.1, 199, 282, 210/283, 285, 433.2, 484, 489, 492; 55/387

[56] References Cited

U.S. PATENT DOCUMENTS

| | | | |
|---|---|---|---|
| 3,174,623 | 5/1965 | Sloan | 210/285 |
| 3,321,085 | 5/1967 | Moorhead | 210/282 |
| 3,523,762 | 5/1967 | Broughton | 210/285 |
| 4,025,427 | 5/1977 | Loeb | 210/687 |

Primary Examiner—Ivars Cintins
Attorney, Agent, or Firm—Hill, Van Santen, Steadman & Simpson

[57] ABSTRACT

An inexpensive, throw-away water purifier is provided for use with water receiving household devices such as coffee makers, portable water containers, ice makers and the like, to treat the water with dosages of water softening and purifying chemicals as the water flows into the devices. The purifiers are small, compact, flat pancake-like units, used singly or in stacked combinations directing water flow in an extended serpentine path through one or more dosages of water treating chemicals. The purifiers have thin impervious plastics material housings, thin porous membranes separating the water treating chemicals from the inlet and outlet of the housing and baffle means directing the water flow in an extended serpentine path as it flows through the membranes and chemicals from a top inlet to a bottom outlet. The purifiers can be thrown away after a single usage and are sized to be compatible with the inlet mouths of standard water receiving household appliances. The purifiers are adapted to be stacked in superimposed relation to afford extended water treatment and provide successive dosages of different types of water purifying and softening chemicals.

14 Claims, 2 Drawing Sheets

DISPOSABLE WATER PURIFIER

FIELD OF THE INVENTION

This invention relates to the art of single use throw-away type water purifiers and specifically deals with pancake-like packets or pads of water treating chemicals.

THE PRIOR ART

Heretofore known water purifiers required expensive, heavy, and bulky containers and were usually permanently installed in household pipelines. Smaller cartridges of water filtering material, such as activated carbon, have been proposed for attachment to water faucets and the like, but these units also require a permanent housing and plumbing attachments and, like their larger counterpart, must be opened up and recharged with fresh chemicals.

Since there are many instances where water purification and softening of a truly portable nature is desired, it would be an improvement in this art to provide inexpensive single use throw-away water purifiers in a compact easily handled package conveniently inserted in the inlet mouth of conventional household appliances and utensils to soften and purify the water just prior to its use. This invention, therefore, provides water purifiers in the form of compact small light weight and easily handled packets which are sufficiently inexpensive to be disposed of after single usage.

SUMMARY OF THE INVENTION

According to this invention, dosages of water treating chemicals are packaged in disposable plastic material housings containing porous filter membranes and baffles to direct water flow from a top inlet in an extended serpentine pass through the membranes and dosages of chemicals as it flows to the bottom outlet of the housing. The dosages can vary in amounts and chemical composition depending on the quality and quantity of the water to be treated. For example, if only about 1 gallon of water with impurities in the range of 0.05 to 0.07% is to be purified, several ounces of chemicals should be sufficient.

The preferred housing may be an inexpensive thin walled stiff shape retaining polyvinyl chloride doughnut-like member about ¾ to 1½ inches high, about 2½ to 4½ inches in diameter, with a central inlet in the top thereof and a central outlet in the bottom thereof, about ½ inch in diameter. The plastics materials, sizes and shapes of the housing can be varied to suit conditions, but the walls of the housing need only be very thin in the order of 0.010 to 0.030 inches for minimizing costs. The housing is easily formed from two molded cup members united in opposed relation around the peripheries of their mouths.

The membranes are preferably a porous plastics material, vacuum molded in hollow tire-shape. Two of these membranes are stacked together in the housing on opposite sides of a thin dividing wall or wafer with a ½ inch hole in its center and with its periphery heat sealed between the rims of the opposed cups forming the housing. The porous plastic members have very thin film-like or membrane-like walls, but stiff enough to hold their shape. Thicknesses in the range of 0.005 to 0.030 inches are useful. The membranes are preferably constructed of a polyolefine molded to a porous state with pores preferably not exceeding about 500 micrometers.

The dividing wall wafer has an outside diameter mating with the rims of the plastic housing cups and preferably has a thickness in the order of 0.02 to 0.03 inches.

The top of the top membrane and the bottom of the bottom membrane are covered with thin circular wafers or baffles of impervious plastics material of the same order of thickness as the dividing wall between the membranes, but no holes are provided in these top and bottom wafers.

All of the plastics materials should, of course, be FDA approved for drinking water use.

The membrane compartments are filled with water treating chemicals, preferably in the form of small beads, flakes or granules of ion exchange resins, activated charcoal and the like. The pair of superimposed membrane compartments may be filled with the same or different chemicals in dosages to insure water purification on a single pass through the housing. The peripheries of the membranes are spaced inwardly from the periphery of the housing and the wafers or baffles are spaced from the top and bottom walls of the housing to direct the water flow from the top inlet radially outward to the periphery of the top membrane, thence radially inward through the chemicals to the central hole in the dividing wall or baffle, thence radially outwardly through the chemical in the bottom membrane, through the periphery of this bottom membrane and thence radially inward to the bottom outlet of the housing. The extended flow path insures fast flow and maximum intimate contact of the water with the chemicals. A gravity flow of only 2 minutes or less for one gallon of water to pass through entire purifier is achieved.

The pad-like purifiers of this invention may vary greatly in size and shape with the plastics material components being quite thin to minimize cost and still provide structural strength to maintain the shape and seal the chemicals in the porous membrane compartments.

It is then an object of this invention to provide a disposable water purifier in the form of a flat pancake-like packet or pad containing one or more dosages of water treating chemicals and adapted for use with conventional water receiving household devices as water is flowed into such devices.

Another object of this invention is to provide a throwaway type water purifier pad for use with conventional household appliances and utensils.

A specific object of this invention is to provide a flat pad or pancake packet containing one or more dosages of water treating chemicals and having a top inlet and a bottom outlet with a porous filter membrane separating the dosage from the inlet and outlet and baffle means in the housing extending the water flow path between the water inlet and outlet.

A further specific object of this invention is to provide a disposable single use water purifier having a doughnut-like housing containing stacked porous membrane compartments filled with water treating chemicals and a serpentine flow path for water through the housing and chemicals.

A very specific object of the invention is to provide a disposable water purifier of thin-walled molded plastics material providing a flat pancake-like pad containing a plurality of superimposed membranes filled with solid particles of water treating chemicals and having exposed peripheral porous walls receiving water flow therethrough together with baffle means directing the water flow in a serpentine path from a top inlet to a bottom outlet of the housing.

Other and further objects of this invention will be apparent to those skilled in this art from the following detailed description of the annexed sheets of drawings, which show a best mode embodiment of the invention.

ON THE DRAWINGS

AS SHOWN ON THE DRAWINGS

In FIGS. 1-4, purifier packets or pads 10 of this invention are illustrated in use with various types of household utentils or appliances to show the compatibility of the purifiers of this invention with standard household devices.

Figure 1:
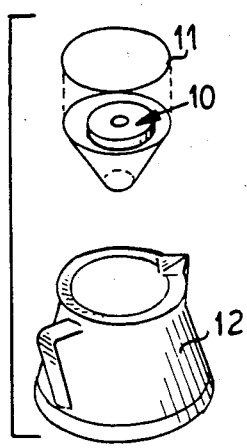
FIGS. 1-4 are somewhat diagrammatic perspective views of water receiving household appliances each provided with a disposable water purifier of this invention at the inlet thereof.

In FIG. 1, the purifier 10 is illustrated as mounted in a funnel 11 for feeding water to a coffeepot 12. The water must pass through the purifier 10.

Figure 2:
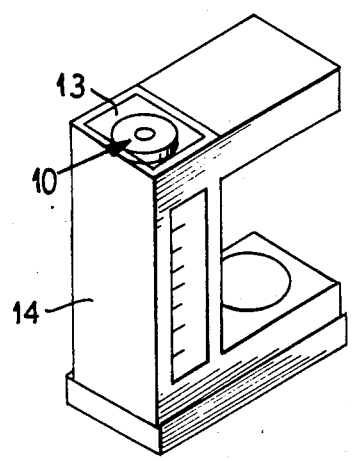

In FIG. 2 the purifier 10 is mounted in the water inlet 13 of a coffee maker 14.

Figure 3:
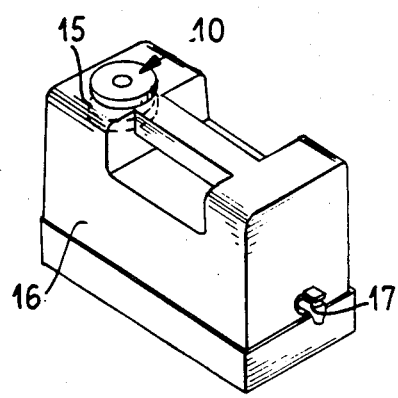

In FIG. 3 the purifier 10 is mounted in the water inlet 15 of a portable molded plastic water bottle 16 having a dispensing outlet 17. The device 16 is of the type conveniently mounted in an icebox to provide chilled water.

Figure 4:
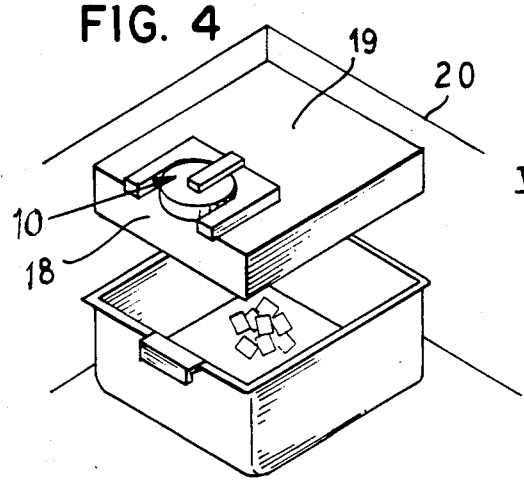

In FIG. 4 the purifier 10 is mounted in the water inlet 18 of an ice cube maker 19 of the type mounted in the freezing compartment of a refrigerator 20.

The conventional household appliances or utentils of FIGS. 1-4 thus have the water fed thereto treated by a purifier 10 of this invention. This purifier 10 is sized for easily handling and may take various shapes to fit the water inlets of the devices. It is completely disposable and thrown away after use. No special holders or auxiliary containers are needed.

Figure 5:
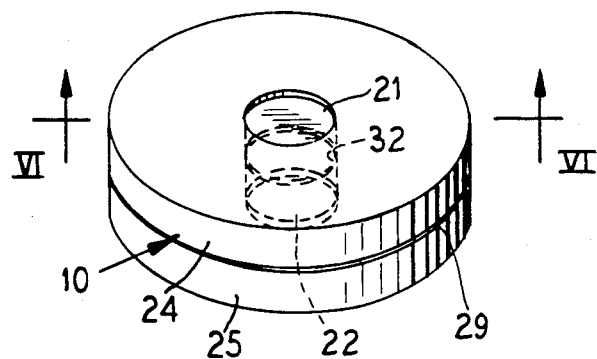
FIG. 5 is a perspective view of a purifier packet or pad of this invention.

As shown in FIG. 5, the purifier 10 is a flat cylindrical pad or pancake-like packet with a top central inlet 21 and a bottom central outlet 22.

Figure 6:
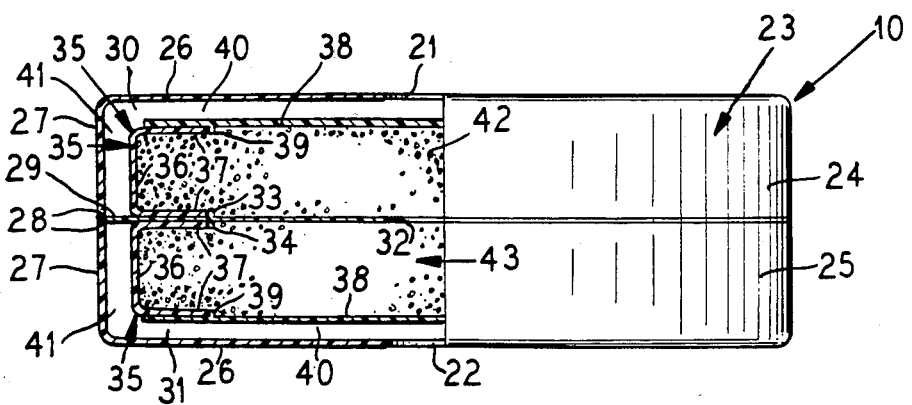
FIG. 6 is a vertical cross sectional view of the purifier along the line VI—VI of FIG. 5.
Figure 7:
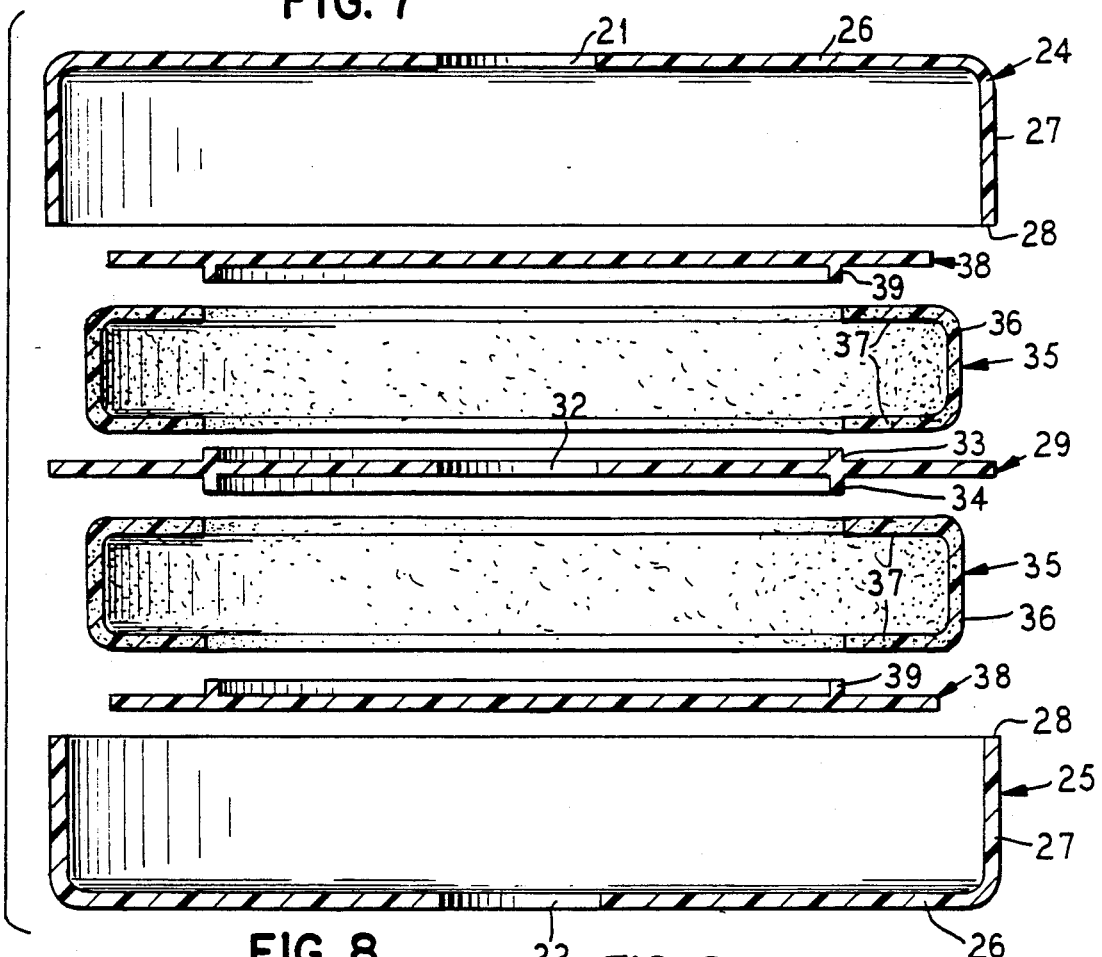
FIG. 7 is an exploded view of the components of the purifier of FIGS. 5 and 6.
Figure 8:
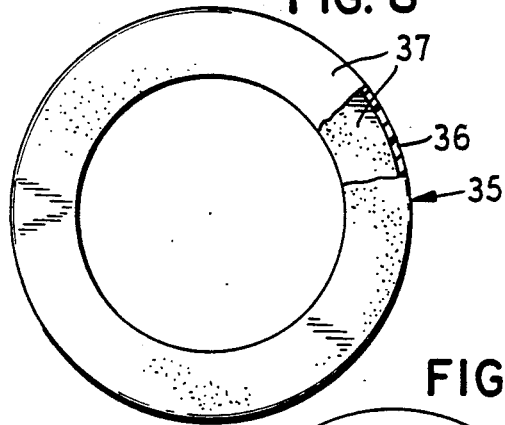
FIG. 8 is a plan view of one of the annular membrane components with parts broken away to show underlying portions.
Figure 9:
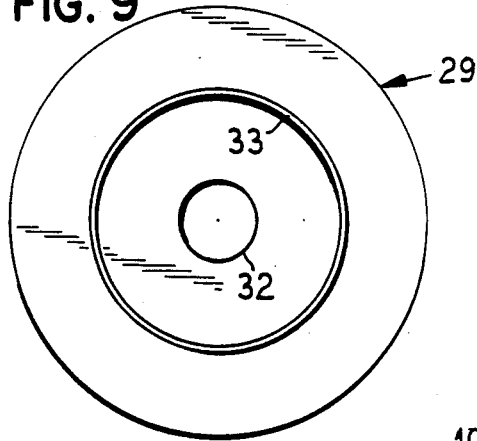
FIG. 9 is a plan view of the separator wall or wafer between the stacked membranes.
Figure 10:
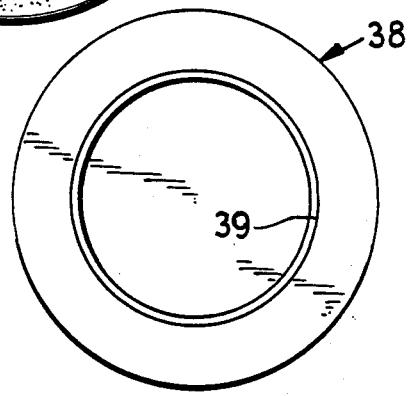
FIG. 10 is a plan view of one of the wafers or baffles at the top and bottom of the stacked membranes.

As shown in FIGS. 6 and 7, the purifier 10 has a housing 23 composed of two thin walled cup-shaped molded plastic halves 24 and 25 each with a flat cylindrical base 26 and an upstanding peripheral cylindrical sidewall 27. The top cup member 24 contains the central circular inlet 21 in its base 26 while the bottom cup member 25 contains the central circular outlet 22. The cylindrical sidewalls 27 of the cup members have aligned rims 28. A thin impervious plastics material circular wall or disk 29 spans the mouths of the inverted cup members 24 and 25 and has its periphery extended between their rims 28. The periphery of the disk 29 is heat sealed to the rims forming a housing with a top compartment 30 and a bottom compartment 31. The wall or disk 29 has a central opening or hole 32 therethrough.

A top cylindrical bead or shoulder 33 and an aligned bottom cylindrical shoulder or bead 34 are integrally formed around the wall or disk 29 between the inlet and periphery of the wall, but closer to the periphery.

A pair of hollow tire-shaped annular porous membranes 35 are seated on opposite faces of the wall 29. These membranes 35 are channel-shaped in cross section with an upstanding outer peripheral wall 36 and radial legs 37. The bottom leg of the top membrane 35 is abutted against the top bead 33 of the wall 29 while the top leg 37 of the bottom membrane 36 is bottomed against the bottom wall 34 of the wall. These legs are secured to the wall 29 as by heat sealing or by an adhesive.

The peripheral wall 36 of each membrane is of smaller diameter than the sidewalls 27 of the cups 24 and 25 forming the housing 23 thereby providing an annular space between the housing and the membrane on each side of the dividing wall 29.

The top leg 37 of the top membrane 35 and the bottom leg 37 of the bottom membrane 35 are covered with thin plastic circular baffles or wafers 38 with each baffle having a bead or shoulder 39 abutting the inner end of the leg. The baffles 38 are sealed to the adjacent leg by heat sealing or glue.

The baffles 38 are spaced inwardly from the top and bottom walls 26 of the housing 23 providing flow paths or gaps 40 commmunicating with the gaps or flow paths 41 surrounding the peripheries of the membranes.

Each membrane 35 is filled with a solid water treating chemical in the form of small granules or beads. Thus, the top membrane maybe filled with an ion exchange resin 42 while the bottom membrane may be filled with a bacteria filtering chemical such as activated charcoal 43.

Water entering the inlet 21 flows through the top gap or passage 40 radially outward to the top peripheral passage 41 and thence through the porous wall 36 of the top membrane 35 to flow radially inward through the dosage of chemicals 42 to exit through the hole 32 in the dividing wall 29 and flow radially outward through the chemicals 43 in the bottom membrane 35, then exiting through the peripheral wall 36 of this bottom membrane 35, into the bottom gap or passage 41 between the bottom membrane and the sidewall 26 of the bottom cup member 25 and thence radially inward through the passage 40 between the bottom baffle 38 and the bottom wall 26 of the bottom cup 25 to exit at the outlet 22. An extended serpentine reversed flow path is thus provided for the water forcing it to flow radially inward through the chemicals in the top membrane and radially outward through the chemicals in the bottom membrane. This arrangement provides increased intimate contact between the chemicals and the water.

While two superimposed membranes are provided in the housing 23, as illustrated, it should be understood that three or more superimposed membranes could also be provided.

Figure 11:
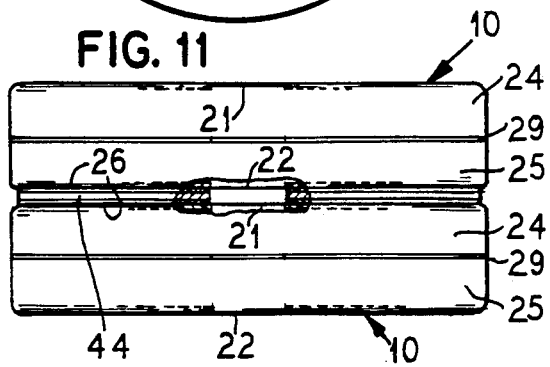
FIG. 11 is a side elevational view showing the manner in which a plurality of the purifiers of FIGS. 1-10 may be stacked and sealed together.

Further, as shown in FIG. 11, a plurality of packets or pads 10 can be stacked in sealed relation connecting the bottom outlet 22 of the top pad with the top inlet 21 of a bottom pad without leakage by the use of an annulus of double-faced adhesive tape 44 between the superimposed pads adhesively sealed to the adjacent walls 26 thereof and surrounding the outlet 22 of the top pad 10 and the inlet 21 of the bottom pad 10.

It will be understood that the components of the purifier pads of this invention are inexpensive plastics material easily molded and having thin walls for economy sake. The porous membranes preferably have pores in the order of 500 micrometer. While the purifiers have been shown in the form of flat pancake-like circular members it should be understood that the shapes of the pads can be varied to suit conditions of use.

From the above descriptions it will be understood that this invention provides an inexpensive, compact, lightweight, water purifier containing selected dosages of water purifying and filtering chemicals and formed from sufficiently inexpensive materials as to warrant disposal after single usage. The devices are sized and shaped to fit water inlets of conventional household appliances and utensils.

I claim as my invention:

1. A single use inexpensive throw-away water treating device which comprises a packet having a top wall, a bottom wall, and a peripheral sidewall connecting said top and bottom walls, said packet filled with one or more dosages of solid water treating chemicals spaced from said walls, said packet having a top inlet opening in the top wall above the dosage and a bottom outlet opening in the bottom wall below the dosage for gravity flow of water through the dosage, water pervious filter means separating the dosage from the top, bottom and sidewalls, and baffle means in the packet extending the water flow from the inlet opening to the sidewall and thence radially inward through the filter means and dosage to the outlet opening.

2. A disposable water purifier pancake packet for use with conventional water receiving household devices which comprises a thin flat wall impervious plastics material housing having a top wall, a bottom wall, and an outer peripheral sidewall connecting said top and bottom walls, said housing containing a dosage of water treating chemicals and having a top inlet opening in the top wall above the dosage and a bottom outlet opening in the bottom wall below the dosage, a porous filter membrane in the housing, means in the housing suspending said membrane in spaced relation from the top, bottom and peripheral sidewalls of the housing and separating the dosage from the peripheral sidewall and the inlet and outlet openings and baffle means in the housing connected to the membrane extending the water flow path from said inlet opening, around the interior of the peripheral sidewall of the housing, and through the membrane and dosage to the outlet opening of the housing.

3. The packet of claim 2 wherein the housing is formed from a pair of inverted open mouth cup members each having an outer peripheral sidewall with a rim edge surrounding the cup mouth and means to secure the rim edges together.

4. The packet of claim 3 wherein an impervious dividing wall has a periphery sandwiched between and secured to said rim edges and a flat body portion spanning the mouths of the inverted cup members to provide top and bottom compartments in the housing.

5. The packet of claim 2 wherein the filter membrane is a hollow annulus with a "C"-shaped transverse cross section providing an open gap around the inner periphery of the annulus.

6. The packet of claim 2 wherein the housing contains a plurality of membranes in superimposed relation each containing a dosage of water treating chemical.

7. A disposable water purifier pad adapted for use with conventional water receiving household devices which comprises a thin flat impervious plastics material housing having a top wall with a central inlet opening therethrough, a bottom wall with a central outlet opening therethrough, and a peripheral sidewall connecting said top and bottom walls, a first a porous filter membrane defining a first compartment in the housing containing a first dosage of a water treating chemical, means in the housing suspending said first filter membrane in spaced relation from the top wall and peripheral sidewall of the housing, a second porous filter membrane defining a second compartment in the housing containing a second dosage of a water treating chemical, means suspending said second filter membrane in the housing in spaced relation above the bottom wall of the housing and the peripheral sidewall of the housing, said first and second compartments having central portions and peripheral portions, a first baffle in the housing spaced below the top wall of the housing supported on the first filter membrane directing flow from the central inlet opening of the housing top wall to the housing periphery for flow into the first compartment, a second baffle sandwiched between the first and second filter membranes directing flow from the central portion of the first compartment to the central portion of the second compartment, and a third baffle in the housing spaced above the bottom wall of the housing supported on the second filter membrane directing flow to the peripheral portion of the second compartment and thence to the central outlet opening.

8. The pad of claim 7 wherein the second baffle separates the compartments and is sealed around its periphery to the housing.

9. The pad of claim 7 wherein each filter membrane compartment is filled with a separate water treating chemical.

10. The pad of claim 9 wherein each porous filter membrane compartment is defined by a hollow annulus.

11. The pad of claim 7 wherien the baffles have integral upstanding beads surrounded by the filter membrane compartments.

12. A disposable water purifier comprising a pad including an impervious housing having a top wall with an inlet opening, a bottom wall with an outlet opening, and a peripheral sidewall connecting said top and bottom walls, a first baffle carried by the peripheral sidewall of the housing spanning the interior of the housing and dividing said interior into a top compartment above the first baffle and a bottom compartment below the first baffle, a first porous filter membrane mounted on top of said first baffle in spaced relation from said top wall and said peripheral sidewall of the housing, a second porous filter membrane suspended from said first baffle below the first baffle and spaced from said bottom wall and peripheral sidewall of the housing, a second baffle supported on said first membrane directing flow from the inlet to the peripheral sidewall of the housing in the top compartment, a third baffle mounted on the bottom of the second membrane directing flow in the bottom compartment from the peripheral sidewall of the housing to the bottom outlet opening, a dosage of water treating chemical in each porous filter membrane, and an opening in the central portion of the first baffle connecting the dosages in each membrane.

13. The pad of claim 12 wherein the means defining the filter membrane compartments are hollow annular plastics material members each with a "C"-shaped transverse cross section providing an open gap around the inner periphery thereof.

14. The purifier of claim 12 wherein the first and second membranes are sealed to the first baffle.

* * * * *